US009632553B2

(12) United States Patent
Kumar Pannem et al.

(10) Patent No.: US 9,632,553 B2
(45) Date of Patent: Apr. 25, 2017

(54) COMPUTING A UNIT RATE OF POWER CONSUMED IN A DATA CENTER

(71) Applicant: VMWARE, INC., Palo Alto, CA (US)

(72) Inventors: Hemanth Kumar Pannem, Bangalore (IN); Kumar Gaurav, Bangalore (IN); Bhaskardas Kambivelu, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 41 days.

(21) Appl. No.: 14/707,051

(22) Filed: May 8, 2015

(65) Prior Publication Data

US 2016/0266630 A1  Sep. 15, 2016

(30) Foreign Application Priority Data

Mar. 12, 2015  (IN) ............................ 1215/CHE/2015

(51) Int. Cl.
*G06F 9/00* (2006.01)
*G06F 1/28* (2006.01)
*G06Q 40/00* (2012.01)

(52) U.S. Cl.
CPC ............... *G06F 1/28* (2013.01); *G06Q 40/12* (2013.12)

(58) Field of Classification Search
CPC .................................. G06F 1/28; G06Q 40/12
USPC ........ 700/291, 286; 713/300, 320, 340, 324; 705/14.11, 14.1, 34, 7.12; 718/1
See application file for complete search history.

(56) References Cited

U.S. PATENT DOCUMENTS

| 9,124,137 | B2* | 9/2015 | Hsu | H02J 3/382 |
| 2009/0234512 | A1* | 9/2009 | Ewing | H04L 12/10 700/295 |
| 2010/0198421 | A1* | 8/2010 | Fahimi | H02J 3/32 700/291 |
| 2010/0207448 | A1* | 8/2010 | Cooper | H02J 3/14 307/20 |
| 2011/0213997 | A1* | 9/2011 | Kansal | G06F 1/3203 713/324 |
| 2011/0295727 | A1* | 12/2011 | Ferris | G06F 11/34 705/34 |
| 2011/0307113 | A1* | 12/2011 | Kumar | B60M 3/00 700/291 |
| 2012/0079299 | A1* | 3/2012 | Cepulis | G06F 1/183 713/320 |
| 2012/0203601 | A1* | 8/2012 | Verfuerth | H05B 37/0272 705/14.1 |
| 2012/0260248 | A1* | 10/2012 | Katiyar | G06F 9/45533 718/1 |
| 2013/0147421 | A1* | 6/2013 | Shin | H02J 7/007 320/101 |

(Continued)

Primary Examiner — Aurel Prifti

(57) ABSTRACT

A power distribution unit having a power supply inputs including mains, secondary, generator, and renewable can be configured to measure how much power is drawn from each of the power supply inputs over a time period and to provide data to a unit rate of power engine indicating the same. A cost information engine can be configured to provide cost information, applicable over the time period, for each of the power supply inputs to the unit rate of power engine. The unit rate of power engine can be configured to compute the unit rate of power consumed in the data center over the time period based on the power drawn from each of the power supply inputs and the cost information.

20 Claims, 3 Drawing Sheets

(56) References Cited

U.S. PATENT DOCUMENTS

| | | | |
|---|---|---|---|
| 2013/0173360 A1* | 7/2013 | Thatcher | G06Q 30/0207 705/14.1 |
| 2013/0245744 A1* | 9/2013 | Hansen | A61F 2/95 623/1.12 |
| 2013/0261824 A1* | 10/2013 | Hazra | H02J 3/18 700/291 |
| 2014/0188583 A1* | 7/2014 | Thatcher | G06Q 50/06 705/14.11 |
| 2014/0266784 A1* | 9/2014 | Ratcliff | G01D 4/004 340/870.03 |
| 2014/0288717 A1* | 9/2014 | Prengler | H02S 10/00 700/286 |
| 2014/0380069 A1* | 12/2014 | Berke | G06F 1/32 713/320 |
| 2015/0074431 A1* | 3/2015 | Nguyen | H02J 3/006 713/300 |
| 2015/0121113 A1* | 4/2015 | Ramamurthy | H02J 9/061 713/340 |
| 2015/0177814 A1* | 6/2015 | Bailey | G06F 1/3234 713/320 |
| 2016/0043594 A1* | 2/2016 | Yamaguchi | H02J 3/14 307/24 |
| 2016/0048185 A1* | 2/2016 | Liang | G05F 1/66 713/340 |
| 2016/0203424 A1* | 7/2016 | Gaurav | G06Q 10/0631 705/7.12 |

\* cited by examiner

COMPUTING A UNIT RATE OF POWER CONSUMED IN A DATA CENTER

CROSS-REFERENCE TO RELATED APPLICATION(S)

Benefit is claimed under 35 U.S.C. 119(a)-(d) to Foreign application Serial No. 1215/CHE/2015 filed in India entitled "COMPUTING A UNIT RATE OF POWER CONSUMED IN A DATA CENTER", on Mar. 12, 2015, by VMware, Inc., which is herein incorporated in its entirety by reference for all purposes.

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may purchase data storage and/or data processing services from the provider in order to run applications that handle the enterprises' core business and operational data. The applications may be proprietary and used exclusively by the enterprise or made available through a network for anyone to access and use.

Data centers may use large amounts of electrical power. For example, a rack of servers may use a few kilowatts of electrical power, while numerous racks of servers housed in a large data center may use on the order of hundreds of megawatts of power over the same time period. Additional devices and support resources in the data center may use additional power. A large data center may use more than 100 times the amount of power used by an office building. The amount of power used for computing in a data center may scale up with faster and/or bigger servers. Power costs for a data center may account for more than 10% of the total operating cost of the data center. More power demand may equate with more operational costs and more environmental stress.

DETAILED DESCRIPTION

Figure 1:
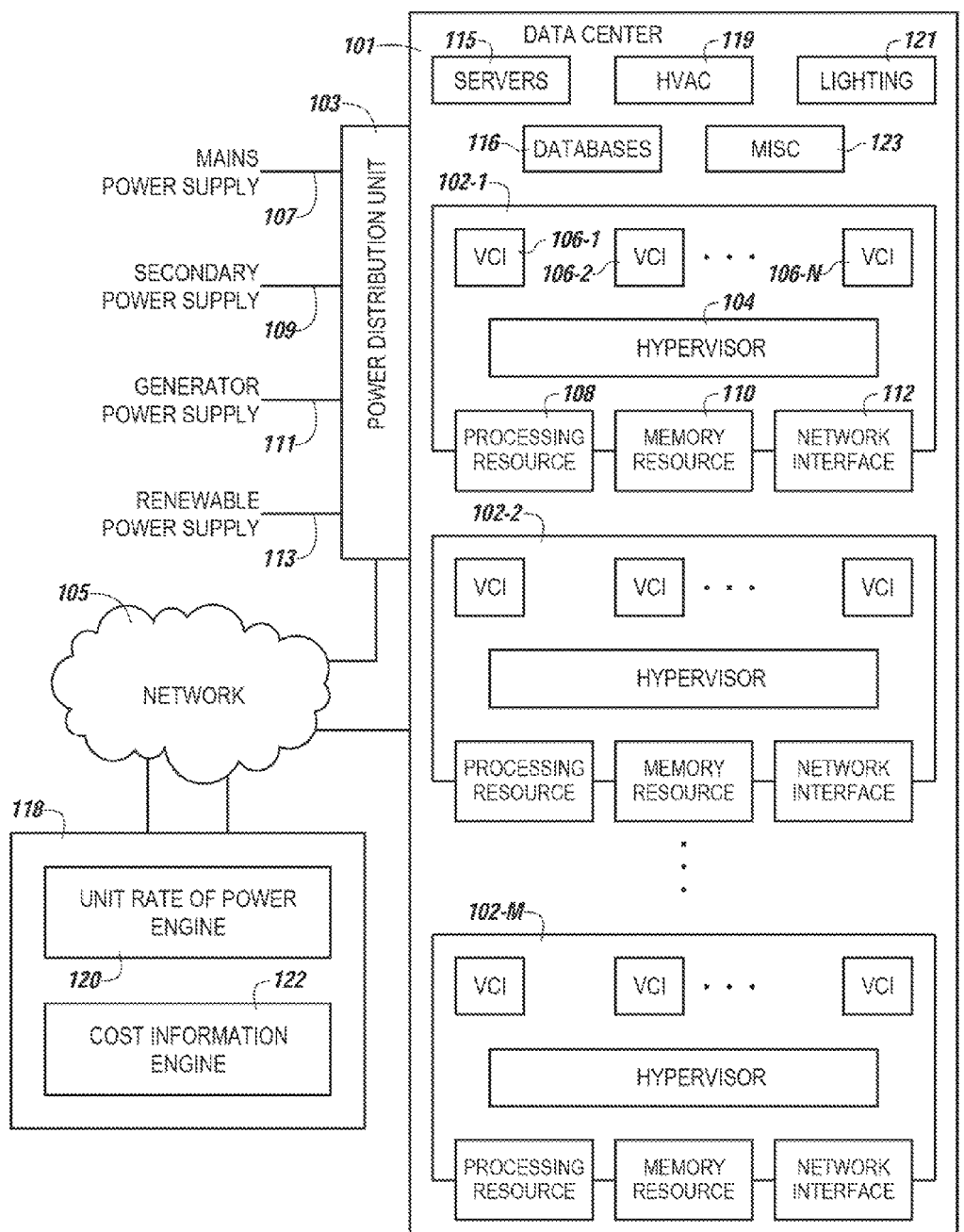
FIG. 1 is a diagram of an environment for computing a unit rate of power consumed in a data center according to a number of embodiments of the present disclosure.

In a data center (e.g., a software defined data center), cost from various drivers such as infrastructure, power, labor, licenses, etc. may be allocated to customers. For example, such costs may be allocated to virtual computing instances (VCIs) provisioned by the data center for the purpose of a monthly showback report to the customers. The term "VCI" covers a range of computing functionality, such as virtual machines, virtual workloads, data compute nodes, clusters, and containers, among others. The term "virtual machine" (VM) refers generally to an isolated user space instance, which can be executed within a virtualized environment. Other technologies aside from hardware virtualization can provide isolated user space instances, also referred to as data compute nodes. Data compute nodes may include non-virtualized physical hosts, VMs, containers that run on top of a host operating system without a hypervisor or separate operating system, and/or hypervisor kernel network interface modules, among others. Hypervisor kernel network interface modules are non-VM data compute nodes that include a network stack with a hypervisor kernel network interface and receive/transmit threads. The term "VCI" covers these examples and combinations of different types of data compute nodes, among others.

VCIs have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more lightweight than VMs.

Efficient power cost estimation, allocation, and optimization in the data center can include computing a unit rate of power consumed in the data center. The problem may be complex because a power distribution unit in a data center may have multiple power sources such as a mains power supply, a secondary power supply, a generator power supply, and/or a renewable power supply.

As the amount of power used by data centers increases, IT service providers may be motivated to draw less of the power used by the data center from the grid (e.g., mains power supply and/or secondary power supply) and to draw more of the power used by the data center from renewable sources of power (e.g., renewable power supply). The power distribution unit can accurately meter the amount of power coming from each source, but the cost should be computed with care. For example, it may be desirable to amortize the cost of generator power supply and renewable power supply and spread the cost evenly over a time period, whereas mains power supply and secondary power supply may be treated on actuals, which can vary over time. A server can have a live power meter to monitor the amount of power consumed by the server (e.g., in real time). In some embodiments, the amount of power consumed can be monitored on a per-VCI basis. According to a number of embodiments of the present disclosure, the unit rate of power consumed by the data center can include capital expenditure for infrastructure and/or operating expenditures for each power supply used by the data center. Different policies can be used to compute the unit cost of power among the different power supplies for the data center.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 118 may reference element "18" in FIG. 1, and a similar element may be referenced as 218 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a diagram of an environment for computing a unit rate of power consumed in a data center according to a number of embodiments of the present disclosure. The environment can include a power distribution unit 103 having power supply inputs including mains power supply 107, secondary power supply 109, generator power supply 111, and/or renewable power supply 113. The mains power supply 107 is the primary source of power from the grid provided by a utility. A secondary power supply 109 is a backup to the mains power supply that may be provided by a different utility and/or according to a different contract with the utility that provides the mains power supply. A generator power supply 111 is a backup power supply that may be actuated in the event of a mains and/or secondary power loss, such as a diesel generator. The generator power supply may be controlled by an entity that controls the data center. A renewable power supply 113 is a power supply from a renewable resource, such as solar, wind, geothermal, etc. The renewable power supply 113 may be controlled by and entity that controls the data center. The mains power supply 107 and the renewable power supply 113 may be referred to herein as "regular" power supplies in that they are the sources from which most of the power for the data center 101 is drawn most of the time. The secondary power supply 109 and the generator power supply 111 may be referred to herein as "backup" power supplies in that they are sources from which power is drawn occasionally, such as during a regular power supply outage.

The power distribution unit 103 can be coupled to and/or part of a data center 101. The power distribution unit 103 can distribute electrical power from any of the power supply inputs to the data center 101. The power distribution unit 103 can measure how much power is drawn from each of the power supply inputs by the data center 101 over a time period. The power distribution unit 103 can filter the power supply inputs to improve power quality, provide intelligent load balancing, and allow for remote and/or local monitoring and control of the flow of power into the data center 101. The power distribution unit 103 can provide data to the unit rate of power engine 120 in the subsystem 118 indicating the power drawn from each of the power supply inputs over the time period. In some embodiments, the power distribution unit 103 can be configured to provide the data to the unit rate of power engine instantaneously over the time period.

Each power supply comes with its own cost. The mains power supply 107 and the secondary power supply 109 include relatively little capital expenditure investment, while the generator power supply 111 and the renewable power supply 113 include relatively more capital expenditure investment (e.g., buying and installing a generator and/or renewable power source such as solar panels, wind turbines, etc.). All of the power supply inputs have some regular operating expense investment. Some examples of costs, other than the cost of the power itself, that impact various power supply inputs include infrastructure, maintenance, labor, facilities, and other costs. In some instances, costs may be offset by rebates or discounts.

Infrastructure costs include capital expense costs on the power supply infrastructure. For example, capital expenditure costs for the mains power supply 107 and/or the secondary power supply 109 may be negligible, while capital expenditure costs for the generator power supply 111 and/or the renewable power supply 113 may be more significant. Depreciation can be applied to the costs using a combination of double declining balance and standard line depreciation over n-number of years (e.g., three to five years) to come to a total cost over a time period (e.g., monthly) due to capital expenditures, which is denoted as $C_{infra}$ herein. Depreciation can be computed as: Yearly depreciation=max(Double declining balance, Straight-line depreciation) where Straight-line depreciation is:

Yearly depreciation=(original cost−accumulated depreciation)/number of depreciation years and where Double declining balance is:

Depreciation rate=2/number of depreciation years;

Yearly depreciation=(original cost−accumulated depreciation)*depreciation rate;

and, in the last year of depreciation:

Yearly depreciation=original cost−accumulated depreciation.

Maintenance costs include costs for repairs and regular maintenance expenses toward power equipment and may be declared as a percentage of total power infrastructure cost over the time period. Maintenance cost is denoted as $C_{maint}$ herein.

Labor costs include the expenses of labor that are paid toward maintaining power infrastructure. This can be applied as the total labor cost over the time period. Labor cost is denoted as $C_{labor}$ herein.

Facilities costs include expenses paid toward rent, etc. This can be specified as rent over the time period, as real-estate cost per rack unit in the data center 101, etc. The facilities cost is denoted as $C_{facilities}$ herein.

Other costs represent any cost paid for power management of the data center 101 that does not fit into one of the previously defined cost categories. The other costs are denoted as $C_{others}$ herein.

Some power supplies such as renewable energy sources may include tax rebates from the government. Such rebates can be specified as a percentage of expenditure on these sources over the time period or as a total rebate amount over the time period. A rebate is denoted as $C_{rebate}$ herein.

The subsystem 118 can be either directly connected to the power distribution unit 103 and/or the data center 101 or remotely connected (e.g., via network 105 as illustrated in FIG. 1). The subsystem 118 can include a unit rate of power engine 120 and a cost information engine 122 coupled to the unit rate of power engine 120 as described in more detail with respect to FIG. 2. As the subsystem 118 is coupled to the power distribution unit 103 and/or the data center 101, the unit rate of power engine 120 and/or the cost information engine 122 are coupled to the power distribution unit 103 and/or the data center 101. In some embodiments, the subsystem 118 can be a server, such as a web server.

According to some embodiments of the present disclosure, different policies can be used to compute power consumed in the data center 101. For example, a computation can be based on an average unit rate where customers of the data center 101 can be charged at a same, average rate over the time period. As another example, a computation can be based on an instantaneous unit rate where customers of the data center 101 can be charged differently at different times over the time period. An example of this is peak versus off-peak pricing for power. In some embodiments, costs for different power supplies can be computed differently. For example, the cost of power supplied by backup power supplies may be computed on an average basis rather than instantaneously due to the irregular usage pattern of backup power supplies. The cost of the irregular usage of backup power supplies can be averaged over customers of the data center 101 that ran workloads over the time period. As another example, costs for power supplies such as a mains power supply 107 and a secondary power supply 109 may be computed instantaneously where utilities provides an instantaneous rate for such power supplies. As yet another example, power supplies having relatively high capital expenditure costs may be charged on an average basis to help balance the relatively high capital expenditure costs. According to the present disclosure, an administrator of the subsystem 118 can set an operating parameter to choose which policy to use to compute the unit rate of power consumed in the data center 101 (e.g., via an input 217 illustrated in FIG. 2).

An average unit rate of power consumed in the data center 101 can be computed using both instantaneous unit rates for those power supplies for which an instantaneous rate is applicable and an average unit rate for other power supplies. The instantaneous unit rate for a particular power supply is $U_i(t)$, the instantaneous amount of power consumed from the primary power supply is $P_i(t)$, and the instantaneous power consumed from other power supplies is $P_{other}(t)$, where t indicates an instantaneous time. The total amount of power consumed in the data center 101 over a month can be computed as:

$$E_{total} = \int (P_i(t) + P_{other}(t)) dt \tag{1}$$

The total operating expense costs for the data center 101 can be computed as:

$$C_{totalopex} = C_{maint} + C_{labor} + C_{facilities} + C_{other} - C_{rebate} \tag{2}$$

The total power consumed from the particular power supply can be computed as:

$$E_i = \int P_i(t) dt \tag{3}$$

The average unit rate for the particular power supply can be computed as:

$$\hat{U}_i(t) = (\int U_i(t) P_i(t) dt + (E_i/E_{total}) * C_{totalopex})/E_i \tag{4}$$

Thus, the average unit rate can be computed for each power supply that has an instantaneous unit rate.

For a particular power supply that has a capital expenditure cost, the capital expenditure cost can be denoted as $C_r$ and the instantaneous power consumed from the power supply can be denoted as $P_r(t)$. The total power consumed from the particular power supply can be computed as:

$$E_r = \int P_r(t) dt \tag{5}$$

The total cost for the power supply can be computed as:

$$C_{rtotal} = (C_r - \text{depreciated\_amount}) + (E_r/E_{total}) * C_{totalopex} \tag{6}$$

The average unit rate can be computed as:

$$\hat{U}_r(t) = C_{rtotal}/E_r \tag{7}$$

The average unit rate for all of the power supplies in the data center 101 can be computed as:

$$\hat{U}(t) = \Sigma \hat{U}_i(t) + \Sigma \hat{U}_r(t) \tag{8}$$

Thus, the average unit rate for the entire data center 101 can be computed according to a first policy.

Some power supplies may have an instantaneous unit rate $(U_{fi}(t))$. The instantaneous operating expense rate can be computed as:

$$C_{totalopex}(t) = C_{totalopex}/T \tag{9}$$

where T is the time period (e.g., a month). Instantaneous operating expense rate can be proportioned to the power drawn from a particular power supply as:

$$U_{opex}(t) = (P_i(t)/(P_i(t) + P_{other}(t))) * C_{totalopex}(t) \tag{10}$$

The instantaneous unit rate for the particular power supply can be computed as:

$$U_{fi}(t) = U_i(t) + U_{opex}(t) \tag{11}$$

For backup power supplies such as the secondary power supply 109 that may have an instantaneous unit rate, the average unit rate $(\hat{U}_i(t))$ can be computed according to Equation 4. For regular power supplies, such as the renewable power supply 113 that has a capital expenditure cost associated therewith, the instantaneous unit rate $(U_{fr}(t))$ can be computed as:

$$U_{fr}(t) = C_{rtotal}/(T * P_r(t)) \tag{12}$$

The instantaneous unit rate for the resources in the data center 101 can be computed as the sum of the instantaneous unit rates for the regular power supplies and the sum of the average unit rates for the backup power supplies as:

$$U(t) = \Sigma U_{fi}(t) + \Sigma U_{fr}(t) + \Sigma \hat{U}_i(t) \tag{13}$$

Thus, the average unit rate for the entire data center 101 can be computed according to a second policy (e.g., as a function of time). This metric can then be used to compute power cost to VCIs of a shorter time period (e.g., instantaneously, hourly, daily, etc.) and then be integrated or summed over a longer time period (e.g., a month) to come up with accurate power cost allocation per data center entity.

The data center 101 can include a number of hosts 102-1, 102-2, . . . , 102-M (referred to generally as host 102), each with processing resources 108 (e.g., a number of processors), memory resources 110, and/or a network interface 112. The host 102 can be included, for example, in a software defined data center. A software defined data center can extend virtualization concepts such as abstraction, pooling, and automation to data center resources and services to provide information technology as a service (ITaaS). The term "abstraction" does not mean an abstract idea. Rather, abstractions are a logical level of functionality provided by tangible, physical interfaces that are implemented using physical computer hardware such as processing resources, memory resources, and network resources. In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of VCIs 106-1, 106-2, . . . , 106-N (referred to generally herein as "VCIs 106"). The VCIs can be provisioned with processing resources 108 and/or memory resources 110 and can communicate via the network interface 112. The processing resources 108 and the memory resources 110 provisioned to the VCIs can be local and/or remote to the host 102. For example, in a software defined data center, the VCIs 106 can be provisioned with resources that are generally available to the software defined data center and not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106.

The hosts 102 can draw power from the power distribution unit 103, for example, to execute the number of VCIs 106. However, the data center 101 can include other items that draw power from the power distribution unit 103. For example, the data center 101 can include a number of non-virtualized servers 115, heating, ventilation, and cooling (HVAC) 119 equipment, lighting 121, various databases 116 (e.g., to support the hosts 102, the non-virtualized servers 115, and/or other computing equipment), as well as other miscellaneous items 123 that draw power.

Figure 2:
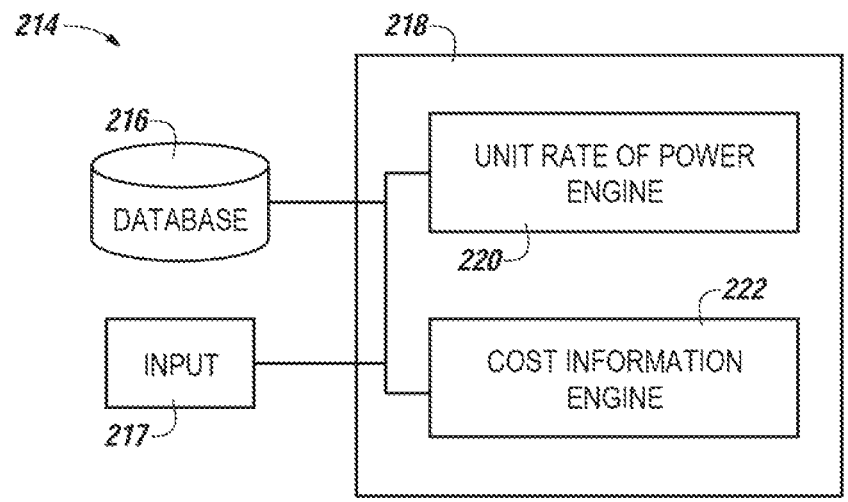
FIG. 2 is a diagram of a system for computing a unit rate of power consumed in a data center according to a number of embodiments of the present disclosure.

FIG. 2 is a diagram of a system for computing a unit rate of power consumed in a data center according to a number of embodiments of the present disclosure. The system 214 can include a database 216, a subsystem 218, a number of inputs 217 to the subsystem 218. The subsystem 218 can include a number of engines, for example unit rate of power engine 220 and/or cost information 222, and can be in communication with the database 216 via a communication link. The system 214 can include additional or fewer engines than illustrated to perform the various functions described herein. The system 214 can represent program instructions and/or hardware of a machine (e.g., machine 324 as referenced in FIG. 3, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the cost information engine 222 can include a combination of hardware and program instructions that is configured to provide cost information, applicable over a time period, for each of the power supply inputs to the unit rate of power engine 220. In some embodiments, cost information can be acquired from the database 216, which can be external to the subsystem 218. For example, in some instances, a utility may make cost information available (e.g., on an instantaneous basis, on a trailing basis, and/or on an average basis) and the cost information engine 222 can collect that information from the database 216 associated with the utility. In some embodiments, the database 216 can be controlled by an entity controlling the data center (e.g., data center 101 illustrated in FIG. 1) and the database 216 can be populated with cost information, known to the entity, for a number of power supply inputs.

In some embodiments, the unit rate of power engine 220 can include a combination of hardware and program instructions that is configured to compute the unit rate of power consumed in the data center over the time period based on the power drawn from each of the power supply inputs and the cost information provided by the unit rate of power engine 220. As described herein, different policies can be used to compute the unit rate of power consumed in the data center. The unit rate of power engine 220 can compute the unit rate of power according to various policies, for example, as set by an operating parameter that can be selected via input 217. A first operating parameter can be selected via input 217 to cause the unit rate of power engine 220 to compute the unit rate of power according to a first policy and/or a second operating parameter can be selected via input 217 to cause the unit rate of power engine 220 to compute the unit rate of power according to a second policy. However, embodiments are not limited to a particular number of policies.

The cost information engine 222 can be configured to provide the cost information including an operating expenditure cost and/or a capital expenditure cost for the power supply inputs. For example, the cost information engine 222 can be configured to provide the cost information including a capital expenditure cost for the generator power supply and the renewable power supply. The unit rate of power engine 220 can be configured to include the operating expenditure cost and/or the capital expenditure cost in the computation of the unit rate of power. In some embodiments, the cost information engine 222 can be configured, for at least one of the power supply inputs, to provide instantaneous cost information over the time period, and the unit rate of power engine 220 can be configured to compute the unit rate of power as an instantaneous rate of power over the time period (e.g., inclusive of both the instantaneous cost information for the at least one power supply input and cost information for a different one of the power supply inputs that is averaged over the time period).

In some embodiments, the unit rate of power engine 220 can be configured to allocate a cost of powering the data center to VCIs provisioned by the data center according to the unit rate of power consumed in the data center. That is, the unit rate of power engine 220 can use the computed unit rate of power consumed in the data center to charge customers of the data center for the VCIs provisioned for the customers. Such embodiments may help to identify cost saving opportunities for the customers and/or for the entity controlling the data center (e.g., when to run workloads and at what time to run workloads in order to reduce the total power cost).

Figure 3:
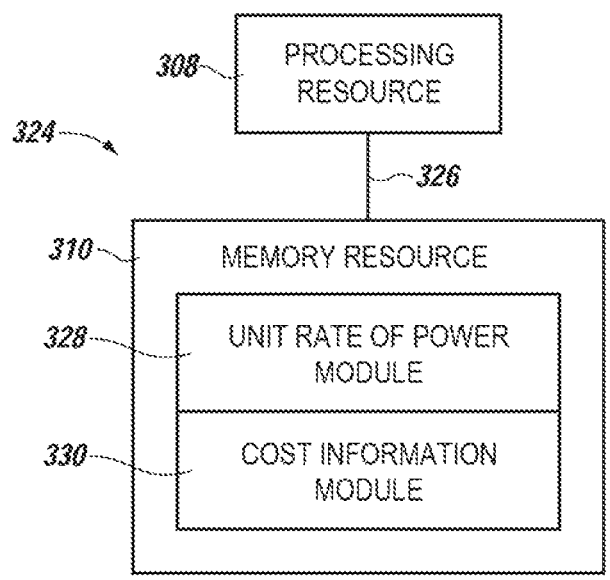
FIG. 3 is a diagram of a machine for computing a unit rate of power consumed in a data center according to a number of embodiments of the present disclosure.

FIG. 3 is a diagram of a machine for computing a unit rate of power consumed in a data center according to a number of embodiments of the present disclosure. The machine 324 can utilize software, hardware, firmware, and/or logic to perform a number of functions. The machine 324 can be a combination of hardware and program instructions configured to perform a number of functions (e.g., actions). The hardware, for example, can include a number of processing resources 308 and a number of memory resources 310, such as a machine-readable medium (MRM) or other memory resources 310. The memory resources 310 can be internal and/or external to the machine 324 (e.g., the machine 324 can include internal memory resources and have access to external memory resources). In some embodiments, the machine 324 can be a VCI. The program instructions (e.g., machine-readable instructions (MRI)) can include instructions stored on the MRM to implement a particular function (e.g., an action such as computing a unit rate of power consumed in a data center). The set of MRI can be executable by one or more of the processing resources 308. The memory resources 310 can be coupled to the machine 324 in a wired and/or wireless manner. For example, the memory resources 310 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 310 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 308 can be coupled to the memory resources 310 via a communication path 326. The communication path 326 can be local or remote to the machine 324. Examples of a local communication path 326 can include an electronic bus internal to a machine, where the memory resources 310 are in communication with the processing resources 308 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 326 can be such that the memory resources 310 are remote from the processing resources 308, such as in a network connection between the memory resources 310 and the processing resources 308. That is, the communication path 326 can be a network connection. Examples of such a network connection can include a local area network (LAN), wide area network (WAN), personal area network (PAN), and the Internet, among others.

As shown in FIG. 3, the MRI stored in the memory resources 310 can be segmented into a number of modules 328, 330 that when executed by the processing resources 308 can perform a number of functions. As used herein a module includes a set of instructions included to perform a particular task or action. The number of modules 328, 330 can be sub-modules of other modules. For example, the cost information module 330 can be a sub-module of the unit rate of power module 328. Furthermore, the number of modules 328, 330 can comprise individual modules separate and distinct from one another. Examples are not limited to the specific modules 328, 330 illustrated in FIG. 3.

Each of the number of modules 328, 330 can include program instructions and/or a combination of hardware and program instructions that, when executed by a processing resource 308, can function as a corresponding engine as described with respect to FIG. 2. For example, the unit rate of power module 328 can include program instructions and/or a combination of hardware and program instructions that, when executed by a processing resource 308, can function as the unit rate of power engine 220 and/or the cost information module 330 can include program instructions and/or a combination of hardware and program instructions that, when executed by a processing resource 308, can function as the cost information engine 222.

The machine 324 can include unit rate of power module 328, which can include instructions to determine how much power is drawn from each of the power supply inputs to a data center over a time period based on information received from a power distribution unit coupled to the power supply inputs. The cost information module 330 can include instructions to determine an operating expense for each power supply input over the time period. The cost information module 330 can include instructions to determine a capital expense for at least one of the power supply inputs over the time period.

The unit rate of power module 328 can include instructions to compute a unit rate of power consumed by the data center as a function of time based on the power drawn, the operating expense, and the capital expense according to a first policy in response to a first operating parameter being selected. The instructions to determine the capital expense for at least one of the power supply inputs can include instructions to depreciate the capital expense before the unit rate of power consumption is computed. For example, the instructions to compute the unit rate of power according to the first policy can include instructions to compute an average unit rate of power consumed by the data center over a time period for all of the power supply inputs.

The unit rate of power module 328 can include instructions to compute a unit rate of power consumed by the data center as a function of time based on the power drawn, the operating expense, and the capital expense according to a second policy in response to a second operating parameter being selected. For example, the instructions to compute the unit rate of power according to the second policy can include instructions to compute an average unit rate of power consumed by the data center over a time period for a first subset of the power supply inputs and to compute an instantaneous unit rate of power consumed by the data center over the time period for a second subset of the power supply inputs. The second set of power supply inputs can include those power supply inputs that have a peak rate and an off-peak rate (e.g., a mains power supply input and a secondary power supply input). The first subset of power supply inputs can include a generator power supply input and a renewable power supply input.

The unit rate of power module 328 can include instructions to allocate a cost of powering the data center to customers of the data center according to the unit rate of power consumed by the data center (e.g., regardless of by which policy the unit rate of power is computed). For example, the instructions to allocate the cost of powering the data center can include instructions to allocate the cost to the customers at an average unit rate of power.

Figure 4:
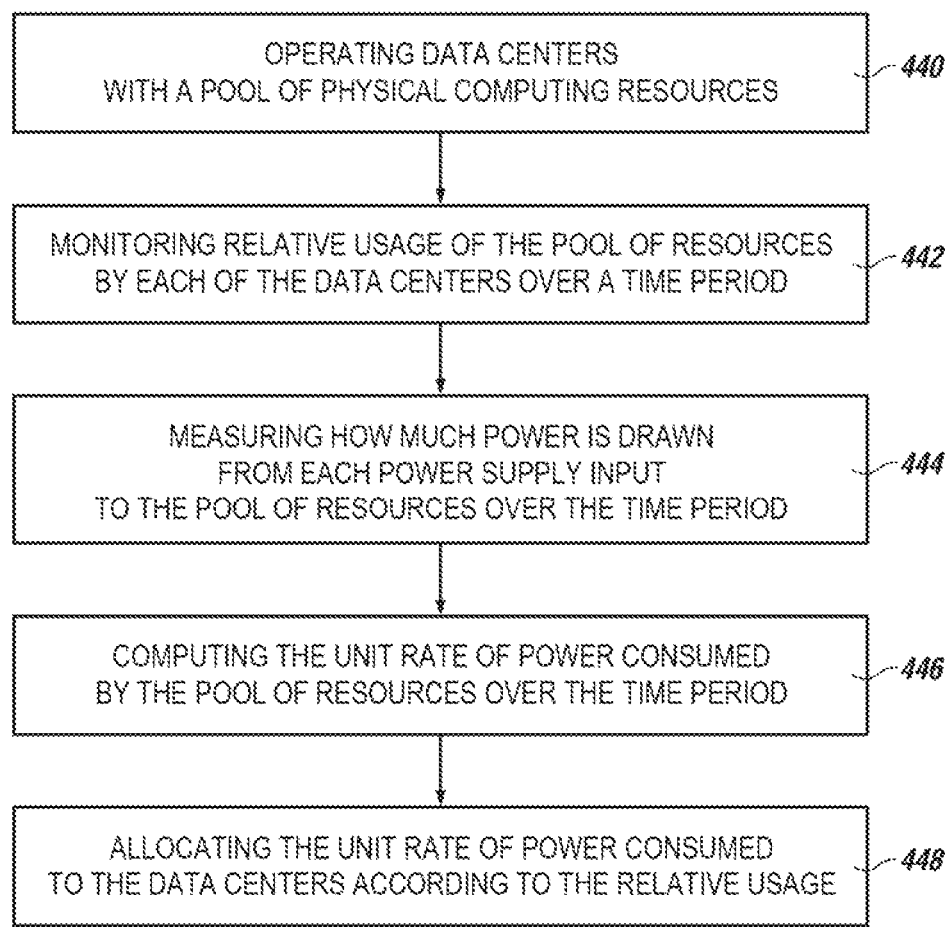
FIG. 4 is a flow chart illustrating a number of methods for computing a unit rate of power consumed in a data center according to a number of embodiments of the present disclosure.

FIG. 4 is a flow chart illustrating a number of methods for computing a unit rate of power consumed in a data center according to a number of embodiments of the present disclosure. At 440 the method can include operating software defined data centers with a pool of physical computing resources. In some embodiments, the pool of physical computing resources can be distributed in more than one geographic location. At 442 the method can include monitoring a relative usage of the pool of physical computing resources by each of the software defined data centers over a time period. At 444 the method can include measuring, with a power distribution unit, how much power is drawn from each of the power supply inputs to the pool of physical computing resources over the time period. At 446 the method can include computing the unit rate of power consumed by the pool of physical computing resources over the time period based on the power drawn from each of the power supply inputs and cost information, applicable over the time period, for each of the power supply inputs. At 448 the method can include allocating the unit rate of power consumed to the software defined data centers according to the relative usage.

In some embodiments, the method can include provisioning VCIs in each of the software defined data centers. In such embodiments, monitoring the relative usage of the pool of physical computing resources by each of the software defined data centers can include monitoring the relative usage per VCI (e.g., monitoring a relative proportion of processor resources used by each of the VCIs). Allocating the unit rate of power consumed can include allocating the unit rate of power consumed to the software defined data centers on a per VCI basis.

In some embodiments, the method can include receiving the cost information for the power supply inputs. For example, an input of a first plurality of instantaneous rates, applicable over the time period, can be received for a mains power supply, a second plurality of instantaneous unit rates, applicable over the time period, can be received for a secondary power supply, an input of a first unit rate for a generator power supply can be received, and an input of a second unit rate for a renewable power supply can be received. As another example, an input of a first average unit rate, applicable over the time period, can be received for a mains power supply, a second average unit rate, applicable over the time period, can be received for a secondary power supply, a first unit rate for a generator power supply can be received, and a second unit rate for a renewable power supply can be received.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system for computing a unit rate of power consumed in a data center, comprising:
   a power distribution unit having a plurality of power supply inputs, wherein the power distribution unit is configured to measure how much power is drawn from each of the plurality of power supply inputs over a time period;
   a plurality of hosts configured to draw power from the power distribution unit to provision and execute respective virtual computing instances (VCIs) for each of a plurality of customers, wherein the plurality of hots include power meters to monitor an amount of power consumed on a per-VCI basis;
   a subsystem coupled to the power distribution unit, the subsystem including a processing resource and a non-transitory machine-readable medium storing instructions executable by the processing resource to:
      acquire cost information, applicable over the time period, for each of the plurality of power supply inputs;
      compute the unit rate of power consumed in the data center over the time period based on the power drawn from each of the plurality of power supply inputs and the cost information; and
      allocate a cost of powering the data center according to the unit rate of power consumed in the data center to a plurality of customers of the data center on a per-VCI basis.

2. The system of claim 1, wherein the instructions are executable to:
   acquire the cost information including an operating expenditure cost for the plurality of power supply inputs from a database external to the subsystem; and
   include the operating expenditure cost in the computation of the unit rate of power.

3. The system of claim 2, wherein the power distribution unit is configured to provide data to the subsystem indicating power drawn from each of the power supply inputs over the time period instantaneously over the time period;
   wherein the instructions are executable, for at least one of the plurality of power supply inputs, to provide instantaneous cost information over the time period; and
   wherein the instructions are executable to compute the unit rate of power as an instantaneous rate of power over the time period.

4. The system of claim 3, wherein the instructions are executable to compute the unit rate of power as an instantaneous rate of power inclusive of both the instantaneous cost information for the at least one of the power supply inputs and cost information for a different one of the power supply inputs that is averaged over the time period.

5. The system of claim 2, wherein the instructions are executable to:
   acquire the cost information including a capital expenditure cost for two of the plurality of power supply inputs comprising a generator power supply and a renewable power supply; and include the capital expenditure cost in the computation of the unit rate of power.

6. The system of claim 1, wherein one of the plurality of power supply inputs comprises a renewable power supply input that is controlled by an entity controlling the data center.

7. The system of claim 1, wherein the plurality of power supply inputs include mains power supply, secondary power supply, generator power supply, and renewable power supply.

8. A non-transitory machine-readable medium storing instructions executable by a processing resource to cause a computing system to:
determine how much power is drawn from each of a plurality of power supply inputs to a data center over a time period based on information received from a power distribution unit coupled to the plurality of power supply inputs;
determine how much power is drawn from the power distribution unit to provision and execute respective virtual computing instances (VCIs) for each of a plurality of customers based on information received from a plurality of hots;
compute a unit rate of power consumed by the data center as a function of time based on the power drawn, an operating expense for each of the plurality of power supply inputs over the time period, and a capital expense for at least one of the plurality of power supply inputs over the time period according to a first policy in response to a first operating parameter being selected;
compute the unit rate of power consumed by the data center as a function of time based on the power drawn, the operating expense, and the capital expense according to a second policy in response to a second operating parameter being selected; and
allocate a cost of powering the data center according to the unit rate of power consumed by the data center to a plurality of customers of the data center on a per-VCI basis.

9. The medium of claim 8, wherein the instructions to compute the unit rate of power according to the first policy comprise instructions to compute an average unit rate of power consumed by the data center over a time period for all of the plurality of power supply inputs.

10. The medium of claim 9, wherein the instructions to allocate the cost of powering the data center to the plurality of customers comprise instructions to allocate the cost to the plurality of customers at the average unit rate of power.

11. The medium of claim 8, wherein the instructions to compute the unit rate of power according to the second policy comprise instructions to:
compute an average unit rate of power consumed by the data center over a time period for a first subset of the plurality of power supply inputs; and
compute an instantaneous unit rate of power consumed by the data center over the time period for a second subset of the plurality of power supply inputs.

12. The medium of claim 11, wherein the second subset of the plurality of power supply inputs comprise those of the plurality of power supply inputs that include a peak rate and an off-peak rate.

13. The medium of claim 11, wherein the first subset of the plurality of power supply inputs includes a generator power supply input and a renewable power supply input; and
wherein the second subset of power supply inputs includes a mains power supply input and a secondary power supply input.

14. The medium of claim 8, wherein the instructions to determine the capital expense for at least one of the plurality of power supply inputs include instructions to depreciate the capital expense before the unit rate of power consumption is computed.

15. A method for computing a unit rate of power consumed in a data center, comprising:
operating a plurality of software defined data centers with a pool of physical computing resources;
monitoring a relative usage of the pool of physical computing resources by each of the plurality of software defined data centers per virtual computing instance (VCI) provisioned in each of the software defined data centers over a time period;
measuring, with a power distribution unit, how much power is drawn from each of a plurality of power supply inputs to the pool of physical computing resources over the time period;
computing the unit rate of power consumed by the pool of physical computing resources over the time period based on the power drawn from each of the plurality of power supply inputs and cost information, applicable over the time period, for each of the plurality of power supply inputs; and
allocating the unit rate of power consumed to customers of the plurality of software defined data centers according to the relative usage on a per-VCI basis.

16. The method of claim 15, wherein the method includes provisioning a respective plurality of VCIs in each of the software defined data centers.

17. The method of claim 16, wherein monitoring the relative usage of the pool of physical computing resources per VCI comprises monitoring a relative proportion of processor resources used by each of the plurality of VCIs.

18. The method of claim 15, wherein the method includes receiving the cost information for the plurality of power supply inputs, including:
receiving an input of a first plurality of instantaneous unit rates, applicable over the time period, for a mains power supply;
receiving an input of a second plurality of instantaneous unit rates, applicable over the time period, for a secondary power supply;
receiving an input of a first unit rate for a generator power supply; and
receiving an input of a second unit rate for a renewable power supply.

19. The system of claim 15, wherein the method includes receiving the cost information for the plurality of power supply inputs, including:
receiving an input of a first average unit rate, applicable over the time period, for a mains power supply;
receiving an input of a second average unit rate, applicable over the time period, for a secondary power supply;
receiving an input of a first unit rate for a generator power supply; and
receiving an input of a second unit rate for a renewable power supply.

20. The method of claim 15, wherein the method includes operating the plurality of software defined data centers with the pool of physical computing resources that are distributed in more than one geographic location.

* * * * *